United States Patent [19]

Morse et al.

[11] 4,250,961

[45] Feb. 17, 1981

[54] OIL RECOVERY METHOD UTILIZING A SURFACTANT SLUG DRIVEN BY WATER OF A CONTROLLED SALINITY

[75] Inventors: Everett W. Morse; Abdus Satter, both of Houston, Tex.

[73] Assignee: Texaco Inc., White Plains, N.Y.

[21] Appl. No.: 32,429

[22] Filed: Apr. 23, 1979

[51] Int. Cl.³ .................................................. E21B 43/22
[52] U.S. Cl. .................................... 166/252; 166/273
[58] Field of Search ................ 166/273, 274, 252, 270

[56] References Cited

U.S. PATENT DOCUMENTS

| | | | |
|---|---|---|---|
| 3,175,610 | 3/1965 | Osoba | 166/270 |
| 3,343,597 | 9/1967 | Gogarty et al. | 166/274 X |
| 3,346,047 | 10/1967 | Townsend et al. | 166/273 |
| 3,371,710 | 3/1968 | Harvey et al. | 166/273 |
| 3,467,190 | 9/1969 | Dunlap et al. | 166/273 X |
| 3,469,630 | 9/1969 | Hurd et al. | 166/273 X |
| 3,915,230 | 10/1975 | Flournoy et al. | 166/252 |
| 4,008,767 | 2/1977 | Waite | 166/273 |
| 4,074,755 | 2/1978 | Hill et al. | 166/252 |

*Primary Examiner*—Stephen J. Novosad
*Attorney, Agent, or Firm*—Carl G. Ries; Robert A. Kulason; Jack H. Park

[57] ABSTRACT

The efficiency of a low tension surfactant flooding program is improved by first determining the upper and lower boundaries for the range of injected water salinities, that, when intermingled with the injected aqueous surfactant slug will enable the surfactant to resist partitioning into an oil and/or emulsion phase and thereby continue to operate with maximum effectiveness. The water in the driving slug is formulated to fall within the specified salinity boundaries and is then injected at the appropriate time in the sequence of steps in the oil recovery operation.

7 Claims, 2 Drawing Figures

OIL RECOVERY METHOD UTILIZING A SURFACTANT SLUG DRIVEN BY WATER OF A CONTROLLED SALINITY

BACKGROUND OF THE INVENTION

1. Field of the Invention

This invention relates to a method for recovering petroleum from an underground petroleum reservoir wherein an injected surfactant containing fluid is driven by a quantity of water which has a predetermined salinity level designed to prevent partitioning of the surfactant into the oil and/or emulsion phase and thereby retaining maximum effectiveness of the surfactant.

2. Description of the Prior Art

The crude oil which has accumulated in subterranean reservoirs is recovered or produced through one or more wells drilled into the reservoir. Initial production of the crude oil is accomplished by "primary recovery" techniques wherein the natural forces present in the reservoir are utilized to produce the oil. However, upon depletion of these natural forces and the termination of primary recovery a large portion of the crude oil remains trapped within the reservoir. Also, many reservoirs lack sufficient natural forces to be produced by primary methods from the very beginning. Recognition of these facts has led to the development of many enhanced oil recovery techniques. Most of these techniques involve injection of at least one fluid into the reservoir to produce an additional amount of the crude oil therefrom. Some of the more common methods are water flooding, steam flooding, miscible flooding, $CO_2$ flooding, polymer flooding, surfactant flooding, caustic flooding and in situ combusion.

Water flooding, involves injection of water into the subterranean oil reservoir for the purpose of displacing the crude oil from the pore spaces of the reservoir rock towards the producing wells. It is the most economical and widely used of the oil recovery methods. Nevertheless water does not displace oil with high efficiency because of the high interfacial tension between them and because of the resultant immiscible displacement of oil by water.

Surfactant flooding involves the addition of one or more surface active agents, usually referred to as "surfactants", to the water flood for the purpose of minimizing the water flooding problems mentioned above. This has been an area of active interest in the art of enhanced oil recovery methods for many years. For example, in 1941 U.S. Pat. No. 2,233,381 disclosed the use of polyglycolether as a surfactant which increases the capillary displacement efficiency of an aqueous flood. U.S. Pat. No. 3,302,713 discloses the use of petroleum sulfonates as effective surfactants in oil recovery operations. Other surfactants proposed for use in oil recovery processes include alkyl sulfates, alkylaryl sulfates, ethoxylated alkyl or aryl sulfates, alkyl sulfonates, alkylaryl sulfonates and quaternary ammonium salts.

While the above surfactants may be effective under ideal conditions, there are problems concerned with the use of each in most petroleum reservoirs. Some of the most serious problems arise from the effects of salinity extreme in the fluids which contact the surfactant within the reservoir. Such salinity extremes can cause surfactant precipitation and/or surfactant partitioning out of the aqueous phase and into the oil or emulsion phases. This results in an increase in retention of the surfactant within the reservoir matrices and fluids with a resultant loss of efficiency for the surfactant flooding process.

SUMMARY OF THE INVENTION

This invention relates to an enhanced oil recovery process useful in the recovery of oil from subterranean petroleum reservoirs wherein a surfactant containing fluid is injected which is followed by an aqueous driving slug of controlled salinity. The salinity of this aqueous driving slug is designed to fall within upper and lower salinity limits which the surfactant-containing fluid can tolerate without precipitation or formation of emulsions or multiple phases.

DESCRIPTION OF THE PREFERRED EMBODIMENTS

Figure 1:
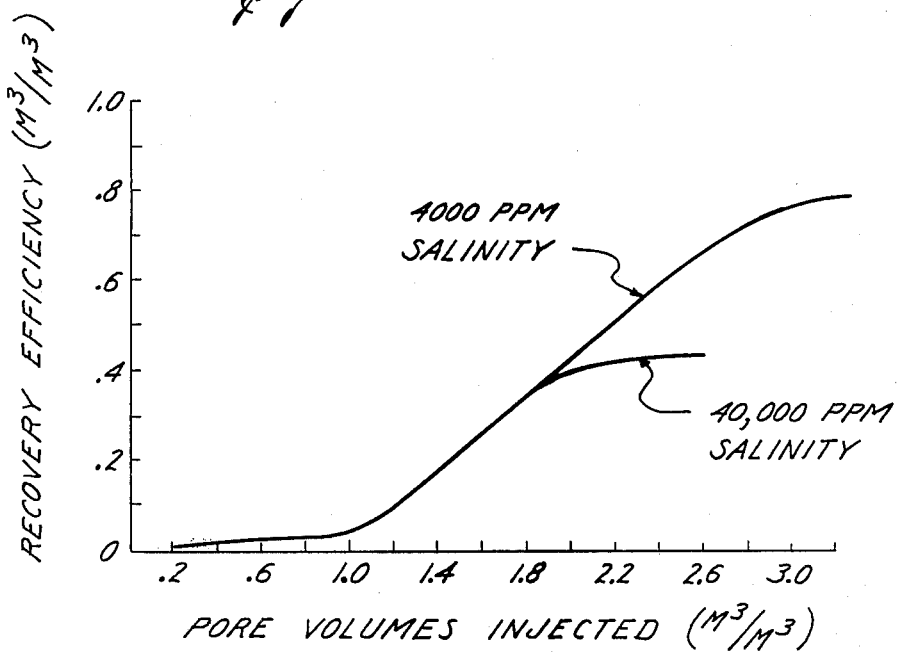
FIG. 1 shows the effect of drive water salinity on oil recovery efficiency in a surfactant flood for various pore volumes of injected fluid.

The usual sequence of operations for a surfactant flooding technique involving surfactants which are effective only within a narrow band of salinities is a first step comprising the injection, as necessary, of a preflush fluid designed to condition a reservoir for the surfactant followed by injections of aqueous surfactant and polymer solutions which are then driven through the reservoir by further injection of water. The preflush fluid is injected to enable the aqueous surfactant solution to operate with maximum effectiveness. The preflush fluid usually consists of a low salinity or fresh water often with sacrificial agents added thereto. The injection of the lower salinity or fresh water serves to reduce the salinity of the formation fluids that the following surfactant slug will encounter. The sacrificial agents are designed to occupy potential precipitation sites within the formation matrix which would attract and cause the following surfactant to precipitate were it not for the presence of the sacrificial agent. Many chemicals have been proposed in the art as sacrificial agents chemically modified lignosulfonates appear to be especially useful in this regard.

The sacrificial agents can be readily selected by one of ordinary skill in the art. In some cases the preflush fluid may not be necessary where the formation fluids are already at a salinity level which would not require further modification to allow the surfactant to operate with maximum effectiveness.

The surfactant contemplated for use in the method of this invention can be any of the commonly used oil field surfactants and especially those which are intolerant of high salinity reservoir environments. The surfactant is injected in the aqueous phase. The surfactant-containing fluid comprises the surfactant, fresh or briny water and, optionally, additives such as sacrificial agents and polymers. The concentration of the surfactant used will vary generally depending upon the particular surfactant as well as the water salinity, water hardness and the chemical composition of the reservoir rocks. It is highly preferred that the optimum response at various concentrations be measured under conditions simulating those which will be present in the reservoir in the concentration corresponding to the optimum surfactant performance. Generally, the concentration of the surfactant will be from about 0.05 to about 10.0% by weight. Although the precise formulation is readily determinable by one with ordinary skill in the art, the volume of the surfactant-containing fluid can vary from about 2 to about 50 pore volume percent. It is anticipated that the injected volume of the surfactant containing fluid would be optimized at the most economically efficient level.

Injection of the surfactant-containing fluid is followed by injection of an aqueous solution of a hydrophilic polymer in order to obtain an effective level of conformance control during the injection process. Generally from about 5 to about 50 pore volume percent of an aqueous solution containing from about 0.01 to about 1.0 percent by weight of a hydrophilic polymer such as polyacrylamide or polysaccharide is used.

Although the injection of the high viscosity polymer slug provides some measure of conformance control, almost invariably the subsequent injection of the much lower viscosity drive water will cause this drive water to break through the polymer into the surfactant-containing fluid slug. Heretofore this effect has been neglected. However, we have discovered that, unless the salinity of the drive water is carefully controlled, partitioning of the surfactant into undesirable oil or emulsion phases will occur upon contact with drive water of undesirable salinities. To this end we propose an improvement upon the above surfactant flooding oil recovery process wherein the drive water is of a carefully controlled salinity level designed to prevent this phenomenon of surfactant partitioning out of the aqueous phase.

Surfactant partitioning out of the aqueous phase can occur when the surfactant encounters fluids which are either of too high or too low salinity. The surfactant-containing fluid should therefore be tested by mixing therewith several samples of the drive water at different salinity levels. In this manner the upper and lower salinity bounds for an effective drive water formulation which will not cause partitioning of the surfactant out of the water phase can be determined. A drive water is then selected that falls within these salinity boundaries and is injected. Following the injection of the polymer slug, injection of this controlled salinity drive water can either be continuous until the termination of the surfactant flooding process or take the form of a discreet slug following the injection of the polymer slug then being followed by a drive water of unspecified salinity. Whichever method is used the result must be the same, namely, that any drive water which breaks through the polymer slug into the surfactant-containing slug will be at this controlled salinity level.

Reference is now made to the following examples which serve to illustrate the invention more fully. The invention should, however, not be deemed as limited to these examples.

EXAMPLE I

Experiments were conducted using a computer program which simulates the enhanced oil recovery process as it takes place within the reservoir. The process of this invention was tested within the confines of one stream tube 330 feet long which is a realistic simulation of the conditions that exist along one fluid path within the reservoir. The following reservoir parameters were employed:

Porosity: 0.138
Absolute permeability: 754 darcies
Reservoir thickness: 2.7 feet
Initial Oil saturation: 0.702
Irreducable water saturation: 0.25
Irreducable oil saturation: 0.25
Viscosity of the water: 0.967 cp
Viscosity of the oil: 3.60 cp The parameters of the simulated low tension water flood were as follows:
Surfactant slug size: 0.243 pore volumes
Injected polymer slug size: 0.210 pore volumes
Surfactant concentration: 16,640 ppm
Polymer concentration: 674 ppm
Final low tension irreducable oil saturation: 0.05
Constant injection rate into the stream tube: 7.0 barrels per day The upper and lower limits for salt concentration expressed as concentration of the chlorine ion were 12,100 and 3,030 ppm respectively. Two different simulated low tension water floods were then run, one with a drive water salinity measured as a concentration of the chlorine ion of 4,000 ppm and the other with the drive water salinity again measured as a concentration of the chlorine ion of 40,000 ppm. The 4,000 ppm concentration corresponds to a drive water salinity that is compatible with the surfactant in as much as it causes no decrease in oil recovery efficiency. The 40,000 ppm salinity drive water corresponds to an incompatible salinity level which causes a marked decrease oil recovery efficiency. A surfactant partition coefficient of 25 was utilized for both simulations. This coefficient is defined as the ratio of the surfactant concentration in the oil phase to that in the aqueous phase. Although this example demonstrates the effects of one drive water salinity which exceeds the upper salinity boundary a similar undesirable oil recovery would result from the use of a drive water with a salinity below the lower salinity boundary.

The results of these computer simulations are reported in FIG. 1 and show that the drive water salinity is indeed a critical factor. The drive water at the 4,000 ppm salinity level which is within the acceptable salinity range reaches a recovery efficiency level of 0.80 where the drive water at the 40,000 ppm salinity which is above acceptable salinty level does not exceed a recovery efficiency of more than 0.45.

EXAMPLE II

The experiments in this example utilize the same computer simulation model as in Example I for the case of 40,000 ppm drive water salinity but vary the partition coefficient of the surfactant instead of the drive water salinity as in Example I. The parameters for the reservoir and water flood were the same as in Example I.

These simulations were restricted to one layer and one stream tube and used partition coefficients of 0.0, 5.0, 25.0 and 50.0, where the partition coefficient again represents the oil phase to the surfactant concentration in the water phase. Hence, a value of 0 for the partition coefficient corresponds to a surfactant that will be found only in the water phase.

Figure 2:
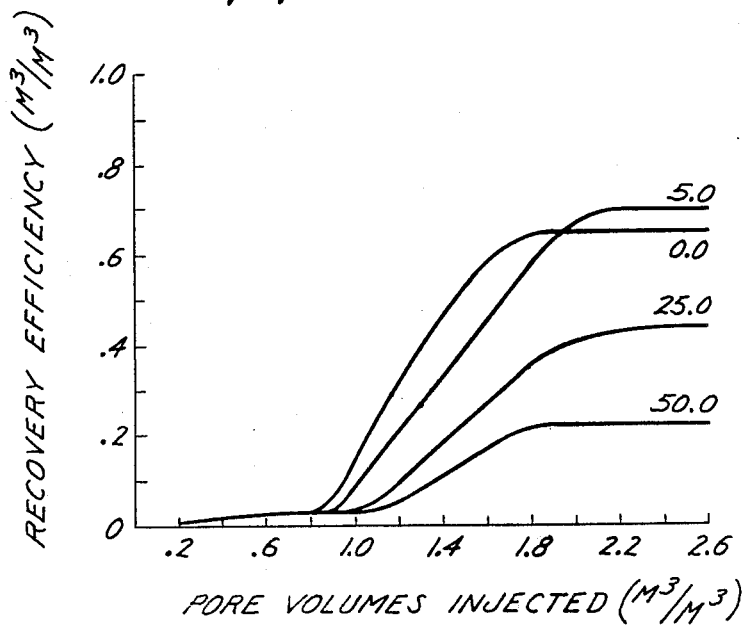
FIG. 2 shows the effect of varying the surfactant partition coefficient on oil recovery efficiency using drive water with a salinity of 40,000 ppm.

The resulting oil recovery efficiency curves are plotted in FIG. 2. Several conclusions can be drawn from this figure. First, increased surfactant partitioning into the oil phase, as expressed by increasing higher partitioning coefficients, results in a time delay in the oil recovery response. This increased residence time within the stream tube upon partitioning into the oil phase is apparently caused by a lower mobility for the surfactant when it is in the oil phase. Second, the oil recovery efficiency drops markedly as the partition coefficient increases. Third, the ultimate oil recovery efficiency is higher at a low level for the partition coefficient than for the zero partition coefficient. This indicates that a small degree of partitioning of the surfactant into the oil phase is in fact desirable.

We claim:

1. In a process for recovering petroleum from a subterranean reservoir wherein the reservoir is penetrated by at least one injection well and at least one production well, said wells being in fluid communication with each other, which comprises injecting a surfactant-containing fluid into the reservoir through said injection well, further injecting a driving agent and recovering petroleum from said production well, the improvement comprising;
   a. determining the upper and lower salinity levels that the surfactant in the surfactant-containing fluid can tolerate and remain able to recover the petroleum efficiently, and,
   b. preparing and injecting the driving agent at a salinity level that is between said upper and lower salinity levels, wherein the driving agent contains as a first increment a quantity of a fluid comprising water and an amount of a hydrophilic polymer sufficient to raise the viscosity of the increment to an effective level, the volume of the increment ranging from about 0.1 to about 1.0 pore volumes of the reservoir.

2. The process of claim 1 wherein the injection of the driving agent is followed by the injection of water of an unspecified salinity.

3. The method of claim 2 wherein the injected volume of the driving agent is sufficient to prevent breakthrough of the injected water of unspecified salinity into the injected surfactant-containing fluid.

4. In a process for recovering petroleum from a subterranean reservoir wherein the reservoir is penetrated by at least one injection well and at least one production well, said wells being in fluid communication with each other, which comprises injecting a surfactant-containing fluid into the reservoir through said injection well, then injecting a fluid comprising water and a quantity of a hydrophilic polymer sufficient to raise the viscosity of the fluid to an effective level, further injecting a driving agent comprising water and recovering petroleum from said production well, the improvement comprising:
   a. controlling the salinity of the driving agent so as to prevent the precipitation of the surfactant out of the surfactant-containing fluid and the irreversible partitioning of the surfactant out of the aqueous phase.

5. The process of claim 4 wherein the process further comprises injecting a formation conditioning fluid prior to the injection of the surfactant-containing fluid.

6. The process of claim 4 wherein the injection of the driving agent is followed by the injection of water of an unspecified salinity.

7. The process of claim 6 wherein the injected volume of the driving agent is sufficient to prevent breakthrough of the injected water of unspecified salinity into the injected surfactant-containing fluid.

* * * * *